United States Patent [19]

Nidiffer et al.

[11] Patent Number: 4,685,624

[45] Date of Patent: Aug. 11, 1987

[54] COFFEE GRINDER WITH BAG ACTUATED SWITCH

[75] Inventors: Charles A. Nidiffer, Decatur; Raymond E. Van Camp, Rochester, both of Ill.

[73] Assignee: Bunn-O-Matic Corporation, Springfield, Ill.

[21] Appl. No.: 841,846

[22] Filed: Mar. 20, 1986

[51] Int. Cl.$^4$ .............................................. B02C 25/00
[52] U.S. Cl. ..................................... 241/36; 241/37.5; 241/100
[58] Field of Search .................. 241/36, 100, 37.5; 99/280, 286

[56] References Cited

U.S. PATENT DOCUMENTS 2,588,025  3/1952  Margolin .......................... 241/36 X
2,900,140  8/1959  Schuhmann et al. ................. 241/36

FOREIGN PATENT DOCUMENTS 1027379  4/1958  Fed. Rep. of Germany ........ 241/36
1067991  10/1959  Fed. Rep. of Germany ...... 241/100
1312229  11/1962  France .............................. 241/100
328053   2/1958  Switzerland ...................... 241/100

Primary Examiner—Mark Rosenbaum
Attorney, Agent, or Firm—Lockwood, Alex, FitzGibbon & Cummings

[57] ABSTRACT

An electric motor driven coffee grinder is turned on by manually activating an on/off/start switch when a bag is in position to receive ground coffee under a discharge chute and automatically turned off when the bag is removed. The grinder motor is controlled by both the manual on/off/start switch and by a switch which is actuated by a pivotally mounted lever responsive to the presence and absence of a bag under the discharge chute. This lever is designed to assume a switch-off position when no bag is present and is pivoted to a switch-on position when a bag is present.

8 Claims, 5 Drawing Figures

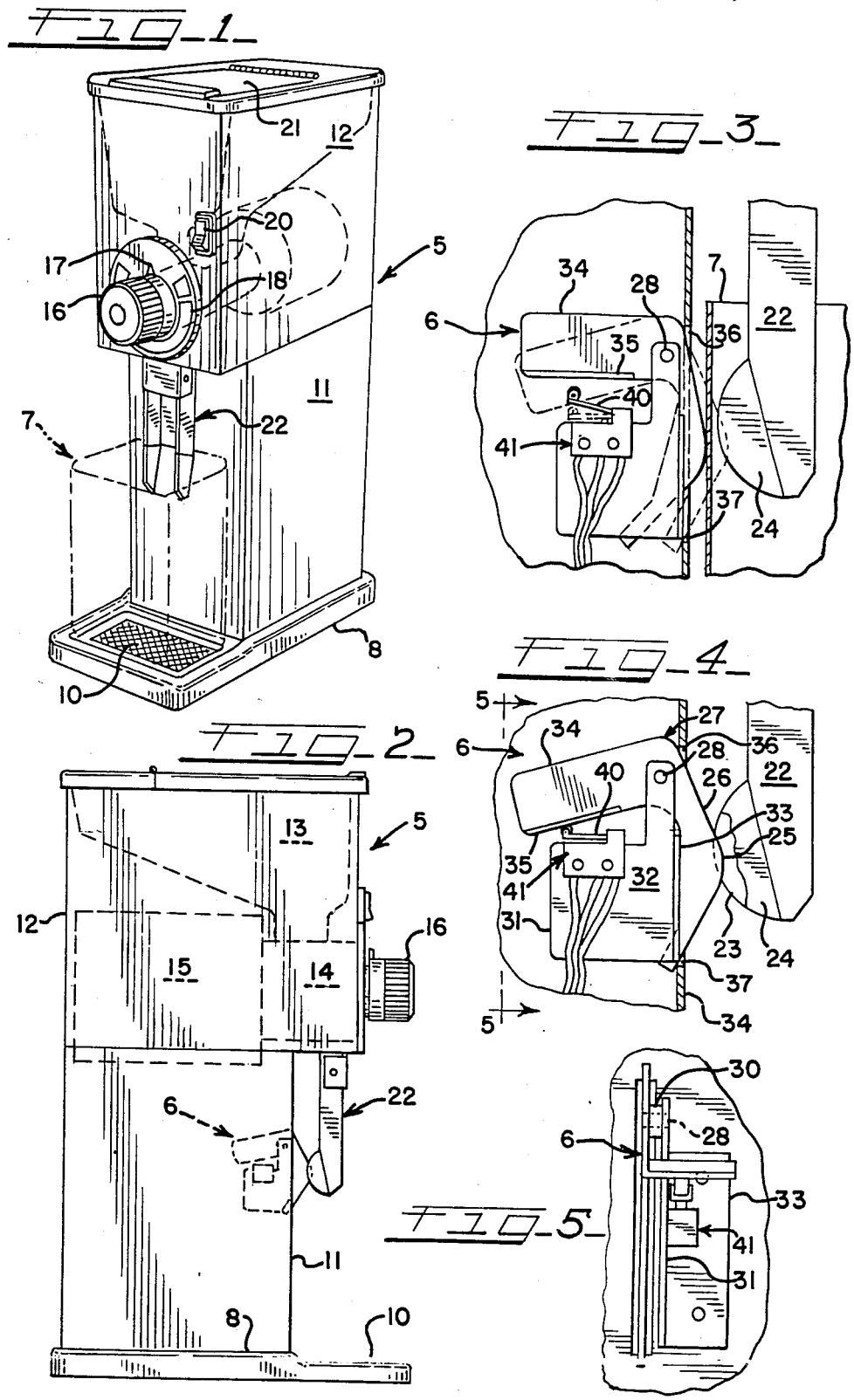

COFFEE GRINDER WITH BAG ACTUATED SWITCH

This invention relates generally to innovations and improvements in coffee bean grinders of the type that will be customer-operated in retail establishments to grind coffee beans in quantities ranging from one to three pounds. More particularly, the invention relates to means for actuating a separate switch which allows a manual on/off/start switch to turn the electric motor drive of such coffee grinders on when a bag is positioned under a ground coffee discharge chute and which automatically turns the electric motor off when the filled bag is removed.

Since coffee grinders of the foregoing type will be operated by many different types of customers, it is important that they be simple and straightforward in operation and turned on only by manually activating a starting switch after an empty bag is in place to receive ground coffee and automatically turned off when the customer removes the filled bag.

Having the foregoing requirements and problem in mind, the object of the invention, generally stated, is the provision of a coffee grinder that will normally be operated by customers desiring to grind individual quantities of coffee beans and which can be turned on only by manipulating an on/off/start switch and only when of an empty coffee bag is in place under a ground coffee discharge chute and which will be automatically turned off on the removal of the bag when the grinding has been completed.

An important object of the invention is the provision of a customer-operated coffee grinder having an electric motor drive controlled by both a manual on/off/-start switch and a separate two-position switch actuated by a pivoted lever designed so as to normally assume its switch-off position but which will be actuated to its switch-on position only when and as long as a bag is present under a coffee chute and engaging a portion of the lever so as to move it to its switch-on position.

For a more complete understanding of the nature of scope of the invention reference may now be had to the following detailed description of a presently preferred embodiment thereof taken in connection with the accompanying drawings, wherein:

FIG. 1 is a perspective view showing the front, top and left side of a coffee grinder in which the invention is incorporated;

FIG. 2 is a right side elevational view of the coffee grinder of FIG. 1;

FIG. 3 is a fragmentary elevational view on enlarged scale showing the bag-actuated switch mechanism of the invention incorporated in the grinder shown in FIGS. 1 and 2 with a bag being present to receive ground coffee;

FIG. 4 is a view corresponding to FIG. 3 showing the condition of the bag actuated mechanism when no bag is present; and, FIG 5 is a detailed elevational view taken on line 5—5 of FIG. 4.

In FIGS. 1 and 2 a grinder is indicated generally at 5 having a bag-actuated means indicated generally at 6 for operating a two-position on/off switch in response to presence or absence of a ground coffee receiving bag 7 shown in broken line in FIG. 1.

The grinder 5 sets on a platform or tray 8 which has a depressed rectangular area in which the grinder sets and a smaller depressed area 10 on which the bags 7 are set. The grinder 5 has a body which includes a lower trunk portion 11 and an upper portion 12 which houses a hopper 13 for the beans, a grinder mechanism 14 and an electric motor 15 operatively connected in driving relationship with the grinder mechanism 14. The degree of fineness to which the coffee beans are ground is customer-adjustable by manipulating a knob 16 and observing where an arrow 17 points on a dial 18 mounted on the front of the upper compartment or housing 12. An on/off/start switch button 20 is also carried in the upper front panel of the grinder which resides in the "on" position when the grinder 5 is operating. In the top of the grinder there is a liftable door 21 which may be raised so as to introduce a charge of coffee beans into the hopper 13.

As shown particularly in FIG. 2, the upper portion 12 of the grinder body overhangs the bag-receiving area 10 of the platform 8 thereby providing for the location of a downwardly extending chute 22 through which ground coffee discharged by the grinder mechanism 14 falls into a bag, such as bag 7, the mouth of which surrounds at least the lower portion of the chute. It will be seen that the chute 22 is relatively long and thereby bags of different heights and sizes can be accommodated by the grinder 5. For example, 1 pound, 2 pound and 3 pound bags typically need to be accommodated in this country.

A pair of spaced, vertically aligned, arcuate ears 23 and 24 project rearwardly from the lower end of the chute 22 so as to receive therebetween the knuckle portion 25 of one leg 26 of an angle-shaped lever 27 pivotally mounted on a pin 28. The pin 28 extends through a weld nut 30 (FIG. 5) carried on the flange 31 of a switch-supporting bracket 32 including a support flange 33 which is spot-welded or otherwise secured on the inside of the front wall 34 of the grinder trunk 11.

The pivoted lever 27 has a second leg 34 from the lower edge of which projects a lateral switch engaging flange 35. The weight of the leg 34 relative to the weight of the leg 26 and the pivot point 28 thereof are such that when the lever 27 is allowed to assume a position without being engaged and pushed one way or the other, it will rotate counterclockwise as viewed in FIGS. 3 and 4. This counterclockwise movement is arrested by the engagement of the lower end of the leg 26 with the bottom of the window 36 formed in the front wall 34 of the grinder trunk 11. This point of engagement is indicated at 37 in FIGS. 3 and 4.

It will be noted from FIGS. 3 and 4 that when the lever 27 is in its most counterclockwise position, the knuckle portion 25 of the leg 26 will protrude in between the arcuate ears 23 and 24. It will also be seen from FIG. 4 that the flange 35 engages and depresses the distal or free end of a leaf spring 40 forming part of a two-condition or two-position switch 41. The details of the switch 41 and the circuit in which it is interconnected do not form a part of the present invention. Suffice it to state that this switch is of known type and has an "off" condition or position and "on" condition or position. For further details reference may be had to John D. Zimmerman application Ser. No. 752,572 filed July 8, 1985, now U.S. Pat. No. 4,607,200, and assigned to the assignee of the present invention and application.

When no bag is present under the ground coffee discharge chute 22 and the lever 27 gravitationally assumes the position shown in FIGS. 2 and 4, the flange 35 engages and depresses the leaf spring 40 to the extent that it actuates the switch 41 to its "off" position.

When a bag 7 is inserted under the discharge chute 22 as illustrated in FIGS. 1 and 3, the upper portion or mouth of the bag 7 will be inserted between the knuckle 25 of the lever 26 and the arcuate edges of the ears 23 and 24. The result is that the bag cams the lever 27 so as to rotate the same clockwise to the position shown in FIG. 3. In this position, the flange 35 on the leg 34 disengages from the leaf spring 40 and allows it to flex upwardly whereupon the switch 41 assumes its "on" position. This in turn allows the manual on/off/start control switch to turn the grinder motor on.

After a batch of beans that has been emptied into the hopper 13 by raising the cover or door 21 has been ground, the filled bag 37 will be removed whereupon the lever 27 is allowed to assume its counterclockwise position shown in FIGS. 2 and 4 wherein the flange 35 engages and depresses the leaf spring 40 thereby actuating the switch 41 to its "off" position so as to automatically turn off the grinder.

What is claimed is:

1. In a coffee grinder comprising a grinder body having a top portion and a trunk portion, a coffee bean hopper in the top portion of said body, a coffee bean grinder mechanism in the upper portion of said body, an electric motor connected in driving relationship with said grinder mechanism, electrical circuit means for energizing said electric motor from a current source and including a manual on/off/start switch and a two-condition switch which in one condition allows said electric motor to be energized by manipulating said on/off/start switch and automatically de-energizes said electric motor in its other condition, ground coffee discharge chute means projecting downwardly from an over-hanging upper portion of said body in spaced relationship with a trunk portion of said body so as to permit the mouth portion of a bag to be inserted between said chute means and said trunk portion, and bag-actuated switch operating means, said two-condition switch being stationarily mounted in said trunk portion, and said bag-actuated switch operating means comprising an angle-shaped lever pivotally mounted on said trunk portion and having a bag-engageable leg and a switch actuating leg, said lever being so balanced that in the absence of a bag mouth inserted between said bag-engageable leg and said discharge chute means said bag-engageable leg rests under the force of gravity in a first position in which said switch actuating leg causes said two-condition switch to be in its said other condition in which said motor is de-energized, and when the mouth of a bag is inserted between said bag-engageable leg and said discharge chute means said lever is moved to a second position in which said switch actuating leg allows said two-condition switch to be in its said one condition wherein said electric motor is allowed to be energized by manipulating said on/off/start switch.

2. In a coffee grinder as called for in claim 2, said discharge chute means having a pair of vertically oriented and spaced ears projecting rearwardly therefrom toward said trunk portion, and said bag-engageable leg being movable into the space between said ears when said switch actuating leg is in its said first position of rest.

3. In a coffee grinder as called for in claim 1, said two-condition switch being mounted on a bracket on the interior of said trunk portion and having an upwardly exposed contact making and breaking leaf spring, said angle shaped lever being pivotally mounted on the interior of said trunk portion at the intersection of its legs, said bag-engageable leg being swingable in a vertical opening in said trunk portion, and said switch actuating leg having a portion which actuates said leaf spring.

4. In a coffee grinder as called for in claim 3, wherein when no bag is inserted between said chute means and said bag-engageable leg said portion of said switch actuating leg depresses said leaf spring, and when a bag is inserted said portion of said switch actuating leg releases said leaf spring.

5. In a coffee grinder as called for in claim 4, said switch being in its motor de-energizing condition when said leaf spring is depressed and in its motor-energizing condition when released.

6. In a coffee grinder as called for in claim 4 wherein when said portion of said switch actuating leg releases said leaf spring it disengages therefrom.

7. In a coffee grinder as called for in claim 4 wherein said leaf spring actuating portion of said switch actuating leg is a laterally projecting flange.

8. In a coffee grinder as called for in claim 3, wherein the distal end of said bag-engaging leg engages said grinder body at the bottom of said vertical opening when said bag-engaging leg is in its said first position of rest.

* * * * *